United States Patent
Chehanowitz et al.

(10) Patent No.: US 11,604,716 B1
(45) Date of Patent: Mar. 14, 2023

(54) SYSTEM, METHOD, AND COMPUTER PROGRAM FOR EVALUATING THIRD PARTY ARTIFICIAL INTELLIGENCE MODELS

(71) Applicant: Amdocs Development Limited, Limassol (CY)

(72) Inventors: Sarit Chehanowitz, Tel Aviv (IL); Liat Taub Bahar, Kfar Sabba (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 199 days.

(21) Appl. No.: 17/137,180

(22) Filed: Dec. 29, 2020

(51) Int. Cl.
*G06F 11/34* (2006.01)
*G06N 20/00* (2019.01)

(52) U.S. Cl.
CPC ......... *G06F 11/3428* (2013.01); *G06N 20/00* (2019.01)

(58) Field of Classification Search
CPC ............................ G06F 11/3428; G06N 20/00
See application file for complete search history.

(56) References Cited

U.S. PATENT DOCUMENTS

| 10,063,453 B1 * | 8/2018 | Ur ........................... H04L 43/50 |
| 11,403,544 B1 * | 8/2022 | Hermoni ................ G06N 7/005 |
| 2020/0364613 A1 * | 11/2020 | Srivatsa ................. G06N 20/00 |

FOREIGN PATENT DOCUMENTS

WO  WO-2022090809 A1 * 5/2022

OTHER PUBLICATIONS

Chehanowitz et al., U.S. Appl. No. 16/835,010, filed Mar. 30, 2020.

* cited by examiner

*Primary Examiner* — Roy Y Yi
*Assistant Examiner* — Geoffrey T Evans
(74) *Attorney, Agent, or Firm* — Zilka-Kotab, P.C.

(57) ABSTRACT

As described herein, a system, method, and computer program are provided for evaluating third party AI models. A request is received from an interested party to evaluate an AI model created by a third party, where the request includes a portion of private data of the interested party, and an expected output of the AI model when applied to the portion of private data of the interested party. The AI model created by the third party is received. The AI model is evaluated by: causing the AI model to process the portion of private data of the interested party, accessing an actual output of the AI model resulting from the processing, and comparing the actual output with the expected output to generate an evaluation of the AI model. The evaluation of the AI model is then reported to the interested party.

12 Claims, 5 Drawing Sheets

SYSTEM, METHOD, AND COMPUTER PROGRAM FOR EVALUATING THIRD PARTY ARTIFICIAL INTELLIGENCE MODELS

FIELD OF THE INVENTION

The present invention relates to third party artificial intelligence models.

BACKGROUND

Artificial intelligence (AI) algorithms are mathematical algorithms that are trained to form a model that makes some inference or prediction based on input data. The AI algorithm can be trained using a supervised method where the AI algorithm learns from labeled input/output pairs, using an unsupervised method where the AI algorithm identifies undetected patterns in a data set with no pre-existing labels, or using a combination of supervised and unsupervised methods.

AI models can be created for any desired purpose, but in any case, a relevant training data set is required to ensure that the AI algorithm can learn to make predictions with some degree of confidence (i.e. with regard to accuracy). In general, the AI algorithm receives a training data set and creates an AI model. In use, the AI model receives one element as input and predicts on it. This requirement of a sufficient training data set can limit some entities from being able to create their own AI models, mainly because the entity may not have access to the type and/or size of data required to form a training data set, and further because creation of the training data set may be costly, if not impossible.

To solve this problem, a third party with access to the type of underlying data required to form a training data set may create an AI model from this data, and then sell, license, etc. the AI model to an interested entity. However, this approach has its own limitations, including that the third party and interested party may not know in advance of any sale, license, or other agreement how well the AI model performs on the interested party's data. This is because the third party may not want to share the AI model with the interested party in advance of an agreement (i.e. to prevent use without payment, or to prevent use on more data records than otherwise agreed), whereas the interested party may not want to disclose its private data to the third party, even for the purpose of "testing" the performance of the AI model on the interested party's data. Further, even if the interested party is able to obtain, in advance, some predictions on its data using the AI model, the interested party may not be able to evaluate a quality of those predictions in a timely manner, particularly where they are used for making business decisions.

There is thus a need for addressing these and/or other issues associated with the prior art, including a need to evaluate third party AI models.

SUMMARY

As described herein, a system, method, and computer program are provided for evaluating third party AI models. In use, a request is received from an interested party to evaluate an artificial intelligence (AI) model created by a third party, where the request includes a portion of private data of the interested party, and an expected output of the AI model when applied to the portion of private data of the interested party. The AI model created by the third party is also received. The AI model is evaluated in association with the portion of private data of the interested party by: causing the AI model to process the portion of private data of the interested party, accessing an actual output of the AI model resulting from the processing of the portion of private data of the interested party, and comparing the actual output with the expected output to generate an evaluation of the AI model. The evaluation of the AI model is then reported to the interested party.

DETAILED DESCRIPTION

Figure 1:
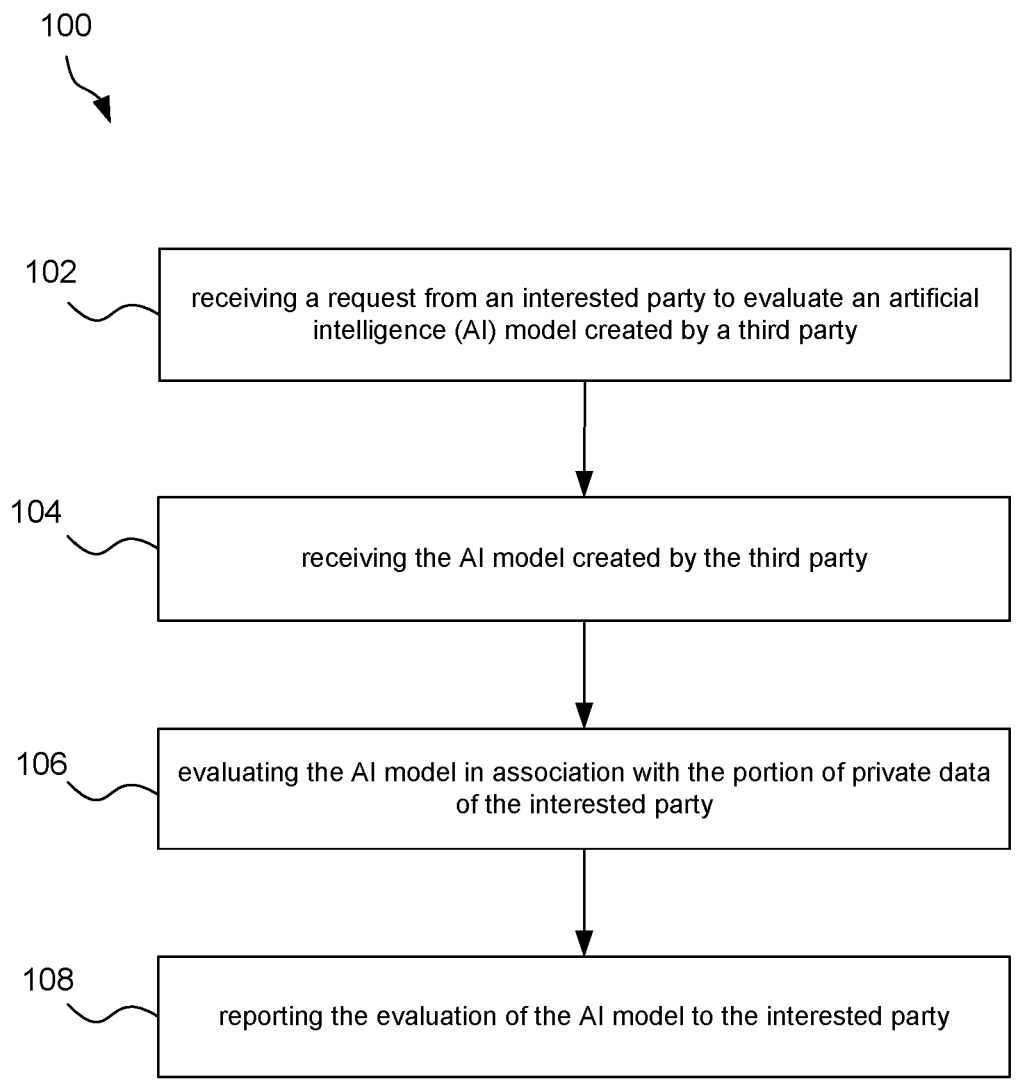
FIG. 1 illustrates a method for evaluating a third party AI model, in accordance with one embodiment.

FIG. 1 illustrates a method 100 for evaluating a third party AI model, in accordance with one embodiment. The method 100 may be performed by any computer system, such as the systems or devices described below with reference to FIGS. 4 and/or 5. For example, the method 100 may be performed by an intermediary entity system, as described below in more detail.

In operation 102, a request is received from an interested party to evaluate an artificial intelligence (AI) model created by a third party, where the request includes a portion of private data of the interested party, and an expected output of the AI model when applied to the portion of private data of the interested party. The interested party may be any business entity having an interest in purchasing, licensing, or otherwise making an agreement to use the AI model created by the third party. In the context of the present method 100, the interested party may refer to any computer system of the interested party capable of issuing the request (e.g. as an electronic communication) to evaluate the AI model created by the third party.

As noted above, the request includes a portion of private data of the interested party. The private data of the interested party may refer to data owned, stored by, or accessible to the interested party which is not shared with, or otherwise made accessible to, the third party. The portion of private data of the interested party may include only a subset of all data records of the interested party. The data records may include customer records of the interested party, just by way of example.

As also noted above, the request includes an expected output of the AI model when applied to the portion of private data of the interested party. In one embodiment, the expected output may be a prediction that the interested party expects the AI model to make for the portion of private data of the interested party. In another embodiment, the interested party may already know a real-world outcome (corresponding to the portion of the private data) which the interested party expects the AI model to predict for the portion of private data of the interested party.

In operation 104, the AI model created by the third party is also received. Accordingly, the AI model may be stored and used as described below. The third party may be any business entity having an interest in selling, licensing, or otherwise making an agreement to share the AI model it has created. In the context of the present method 100, the third party may refer to any computer system of the third party capable of creating the AI model and providing the AI model (e.g. for use by the intermediary entity system).

The AI model may be created by the third party using data other than the private data of the interested party. The AI model may be created using data owned by, stored, or otherwise accessible to the third party. This third party data may be used as a training data set for an AI algorithm to form the AI model.

In operation 106, the AI model is evaluated in association with the portion of private data of the interested party by: causing the AI model to process the portion of private data of the interested party, accessing an actual output of the AI model resulting from the processing of the portion of private data of the interested party, and comparing the actual output with the expected output to generate an evaluation of the AI model. In this way, the evaluation of the AI model may indicate a degree to which the actual output of the AI model matches the expected output provided by the interested entity, or may rate the AI model using some predefined algorithm that is based on the degree to which the actual output of the AI model matches the expected output provided by the interested entity.

In one embodiment, a translator function may be used for the portion of private data of the interested party in combination with causing the AI model to process the portion of private data of the interested party. The translator function may map a schema of the private data of the interested party to a schema used by the third party. In this way, where the AI model is created according to a schema of the data of the third party and thus cannot directly process the portion of the private data of the interested party having a different schema, the translator function may enable the AI model created by the third party to be applied to the portion of the private data of the interested party. This translator function is described in detail in U.S. application Ser. No. 16/835,010, filed Mar. 30, 2020 and entitled "SYSTEM, METHOD, AND COMPUTER PROGRAM FOR USING SHARED CUSTOMER DATA AND ARTIFICIAL INTELLIGENCE TO PREDICT CUSTOMER CLASSIFICATIONS," which is hereby incorporated by reference in its entirety.

In operation 108, the evaluation of the AI model is then reported to the interested party. In this way, the interested party may use the evaluation to make a decision of whether to purchase, license, or otherwise make an agreement with the third party for use of the AI model in conjunction with the private data of the interested party. By evaluating the AI model in this manner, the evaluation result may be provided to the interested party without the third party accessing the portion of private data of the interested party and without the interested party accessing the AI model.

While the method 100 is described above with reference to a single AI model of a single third party, it should be noted that the method 100 may similarly be performed for any number of different AI models of any number of different third parties. In this context, the interested party may be provided with the evaluations of the different AI models. The interested party may then select one of the different AI models to purchase, license, etc., based on the evaluations (e.g. by selecting the AI model providing actual output that most closely matches the expected output).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
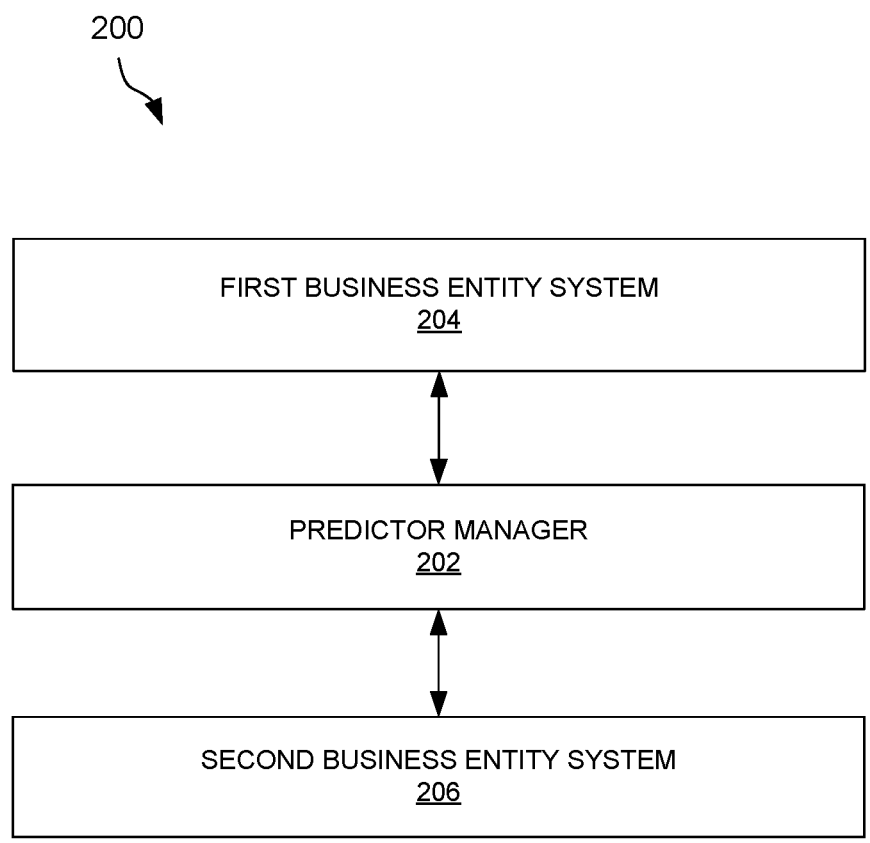
FIG. 2 illustrates a system for evaluating a third party AI model, in accordance with one embodiment.

FIG. 2 illustrates a system 200 for evaluating a third party AI model, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes multiple components, including a predictor manager 202 (also referred to herein as an "intermediary entity system"), a first business entity system 204 (also referred to herein as a "third party"), and a second business entity system 206 (also referred to herein as an "interested party"). The components may each be implemented as a combination of hardware and software. For example, the components may be any of the computer systems described below with reference to FIGS. 4 and/or 5. As also shown, the components are in communication with one another. In one embodiment, the components may be in communication with one another via the same network or different networks.

It should be noted that while only two business entity systems 204, 206 are shown as being interfaced by the predictor manager 202 in the present embodiment, other embodiments are contemplated where the predictor manager 202 interfaces any number of different third parties 204 and/or any number of different interested parties 206. For example, predictor manager 202 may provide an interface between any single interested party 206 and a plurality of different third parties 204, for evaluating AI models of the different third parties 204 on behalf of the interested party 206. This scenario may be repeated for many different interested parties 206.

The first business entity system 204 and the second business entity system 206 are systems 204, 206 of different business entities. The business entities may be in the same line of business or similar lines of business. The business entities may be competitors or business entities in a common supply chain. In any case, the business entities, at least to some extent, have commonalities in the data they possess to enable the first business entity system 204 to create an AI model on its own data that may be useful to the second business entity system 206 for making predictions on its own data.

In one embodiment, the first business entity system 204 stores first customer data. The first customer data is data for a first set of customers of the first business entity. The second business entity system 206 stores second customer data. The second customer data is data for a second set of customers of the second business entity. The first set of customers may or may not overlap with the second set of customers. As noted above, the types of data in the first customer data have some commonality with the types of data in the second customer data. However, the schema (e.g. database schema, including fields) according to which the first customer data is stored may or may not be the same as the schema according to which the second customer data is stored. The customer data, whether referring to the first or second customer data, may be stored by the respective business entities in the context of their normal course of business.

In one embodiment, the customer data, whether referring to the first or second customer data, may include demographic information for customers. The demographic inform may include location, age, salary, gender, an indication of car ownership, an indication of cellular phone ownership, a marriage status, an indication of any kids, an indication of a preference to travel, a type of house owned or rented, etc. In addition, the customer data, whether referring to the first or second customer data, may also include proprietary information generated by the business entities, respectively. The proprietary information may be classifications for the customers, which may be generated by the business entities based on interactions between the business entities and their customers. In various example, the proprietary information may indicate products and/or services of interest to the customer, an indication of whether the customer pays bills on time, content (e.g. television shows) that the customer is interested in, a temperament of the customer (e.g. often complains, is loyal, etc.), etc.

While embodiments are described above with reference to customer data of the business entity systems 204, 206, it should be noted that the descriptions included herein may equally apply to any categories of data, as desired.

The predictor manager 202 is configured to evaluate an AI model of the first business entity system 204 on behalf of the second business entity system 206. In operation, the predictor manager 202 receives a request from the second business entity system 206 to evaluate the AI model created by the first business entity system 204. The request includes a portion of private data of the second business entity system 206, and an expected output of the AI model when applied to the portion of private data of the second business entity system 206.

The AI model created by the first business entity system 204 is also received by the predictor manager 202 from the first business entity system 204. In one embodiment, the predictor manager 202 may include a translator function. The translator function may map a schema of the private data of the second business entity system 206 to a schema used by the first business entity system 204. The translator function may thus be used by the predictor manager 202 to translate the portion of private data of the second business entity system 206 to the schema used by the AI model. This translation may be particularly important where the first business entity system 204 uses a different schema for its data than the second business entity system 206, such that the AI model expects input with the schema of the first business entity system 204.

In one embodiment, the predictor manager 202 may create the translator function based on sample data received by both the first business entity system 204 and the second business entity system 206. One example of a method to create the translator function is described in U.S. application Ser. No. 16/835,010, filed Mar. 30, 2020 and entitled "SYSTEM, METHOD, AND COMPUTER PROGRAM FOR USING SHARED CUSTOMER DATA AND ARTIFICIAL INTELLIGENCE TO PREDICT CUSTOMER CLASSIFICATIONS," which is hereby incorporated by reference in its entirety.

Further, the predictor manager 202 evaluates the AI model in association with the (e.g. translated) portion of the private data of the second business entity system 206 by: causing the AI model to process the portion of private data of the second business entity system 206, accessing an actual output of the AI model resulting from the processing of the portion of private data of the second business entity system 206, and comparing the actual output with the expected output to generate an evaluation of the AI model.

The evaluation of the AI model is then reported to the second business entity system 206. In this way, the second business entity may use the evaluation to make a decision of whether to purchase, license, or otherwise make an agreement with the first business entity for use of the AI model in conjunction with the private data of the second business entity. By evaluating the AI model using the predictor manager 202, which is independent of the first and second business entities, the evaluation result may be provided to the second business entity without the first business entity accessing the portion of private data of the second business entity and without the second business entity accessing the AI model owned by the first business entity.

While operation of the predictor manager 202 is described above with reference to a single AI model of a single business entity, it should be noted that the predictor manager 202 may similarly operate for any number of different AI models of any number of different business entities. In this context, the interested party may be provided with the evaluations of the different AI models. The interested party may then select one of the different AI models to purchase, license, etc., based at least in part on the evaluations (e.g. by selecting the AI model providing actual output that most closely matches the expected output). Of course, such a selection among different AI models may be also be made based on additional criteria, such as cost.

Figure 3:
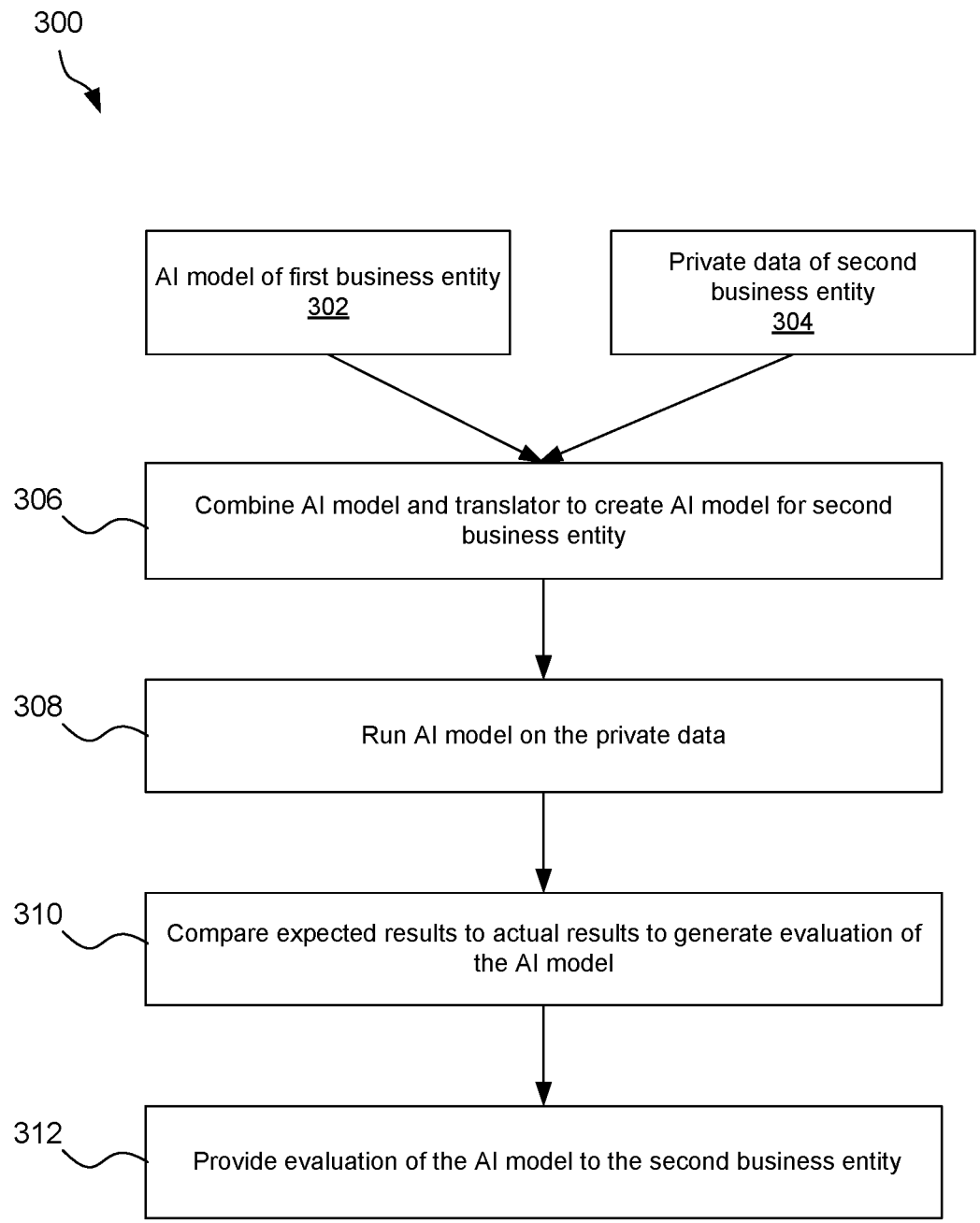
FIG. 3 illustrates a flow diagram of the predictor manager of the system of FIG. 2, in accordance with one embodiment.

FIG. 3 illustrates a flow diagram 300 of the predictor manager 202 of the system 200 of FIG. 2, in accordance with one embodiment.

As shown, the predictor manager 202 receives an AI model 302 created by the first business entity system 204. The predictor manager 202 also receives a portion of private data 304 of the second business entity system 206. The predictor manager 202 combines the AI model with a translator function, as shown in 306, to create an AI model that can run on the portion of private data of the second business entity system 206.

Next, as shown in 308, the predictor manager 202 runs the AI model on the portion of private data of the second business entity system 206 and then in 310 compares expected results predefined by the second business entity system 206 with actual results output by the AI model to generate an evaluation of the AI model. This evaluation the predictor manager 202 shares with the second business entity system 206 in 312 such that the second business entity can than decide whether to buy, license, etc. the AI model from the first business entity. The evaluation may indicate a percentage of accuracy of the AI model based on a percentage of matching between the expected and actual results.

Exemplary Use Case 1

A newspaper has 20000 subscribers to which it can send a monthly email newsletter. The subscribers are all in North Carolina. Advertisers want to include an advertisement and are willing to pay based on success. The newspaper has 10 advertisers but can send only two advertisements in each email as otherwise subscribers will leave, or for any other reasons, they will not read more for example.

For every user the payoff of the advertisement equals: payoff multiplied by probability of the user clicking on the advertisement. The payoff is known but the probability is not known. If the newspaper would have known the probability, it could easily decide which advertisements to attach to each email to maximize profit. It would like to buy, or even better get, a predictor for this probability.

Third parties may offer a predictor (AI model) to the newspaper, including the advertisers, but the value of such predictor is unknown to the newspaper. Even if the third parties are honest about their predictors, the third parties do not know the subscribers of the newspaper and thus do not know how well the predictor will perform on the subscriber data of the newspaper (i.e. the third parties may create their AI models based on subscribers with different demographics than the subscribers of the newspaper).

Thus, the predictor manager 202 may be used as an intermediary to evaluate the AI model on behalf of the newspaper, without requiring the subscriber information of the newspaper to be shared with the third parties and without requiring the predictors of the third parties to be shared with the newspaper.

Exemplary Use Case 2

Assume a business entity collects movement information for elderly people who are located in a particular region. They have movement monitors/trackers (e.g. smart bracelets) that know when and where the people are moving. The business entity would like to know when the people are sick, but such information is not collected by the business entity.

There are multiple third party companies that have created predictors to predict when someone is sick, but this works has been performed for different locations, different ages, different cities, different demographics, etc. The business entity would like to use one of the business entity created by one of the third parties, but does not know which to select.

Thus, the predictor manager 202 may be used as an intermediary to evaluate the AI models on behalf of the business entity, without requiring movement information of the business entity to be shared with the third parties and without requiring the predictors of the third parties to be shared with the business entity.

Figure 4:
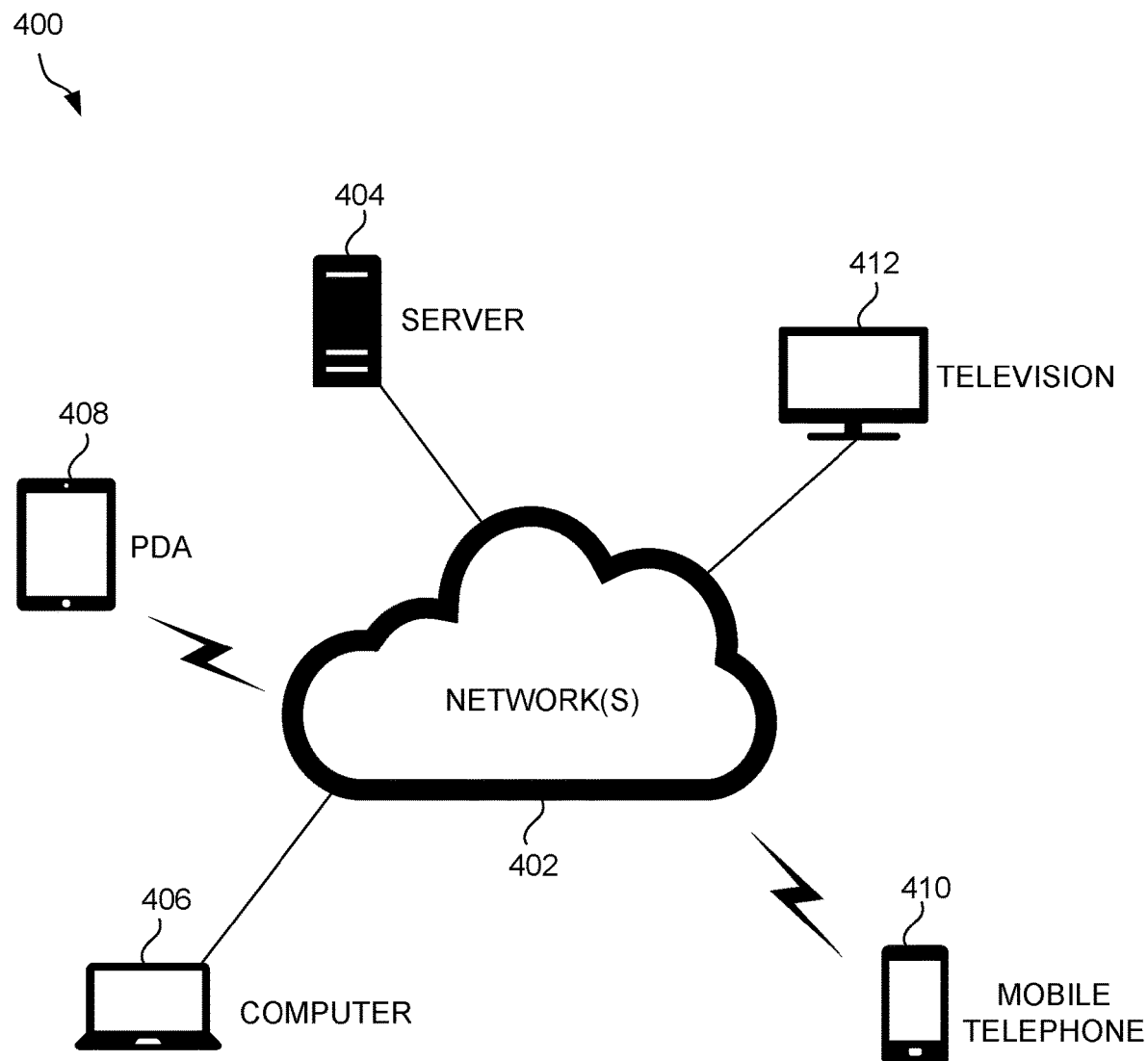
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
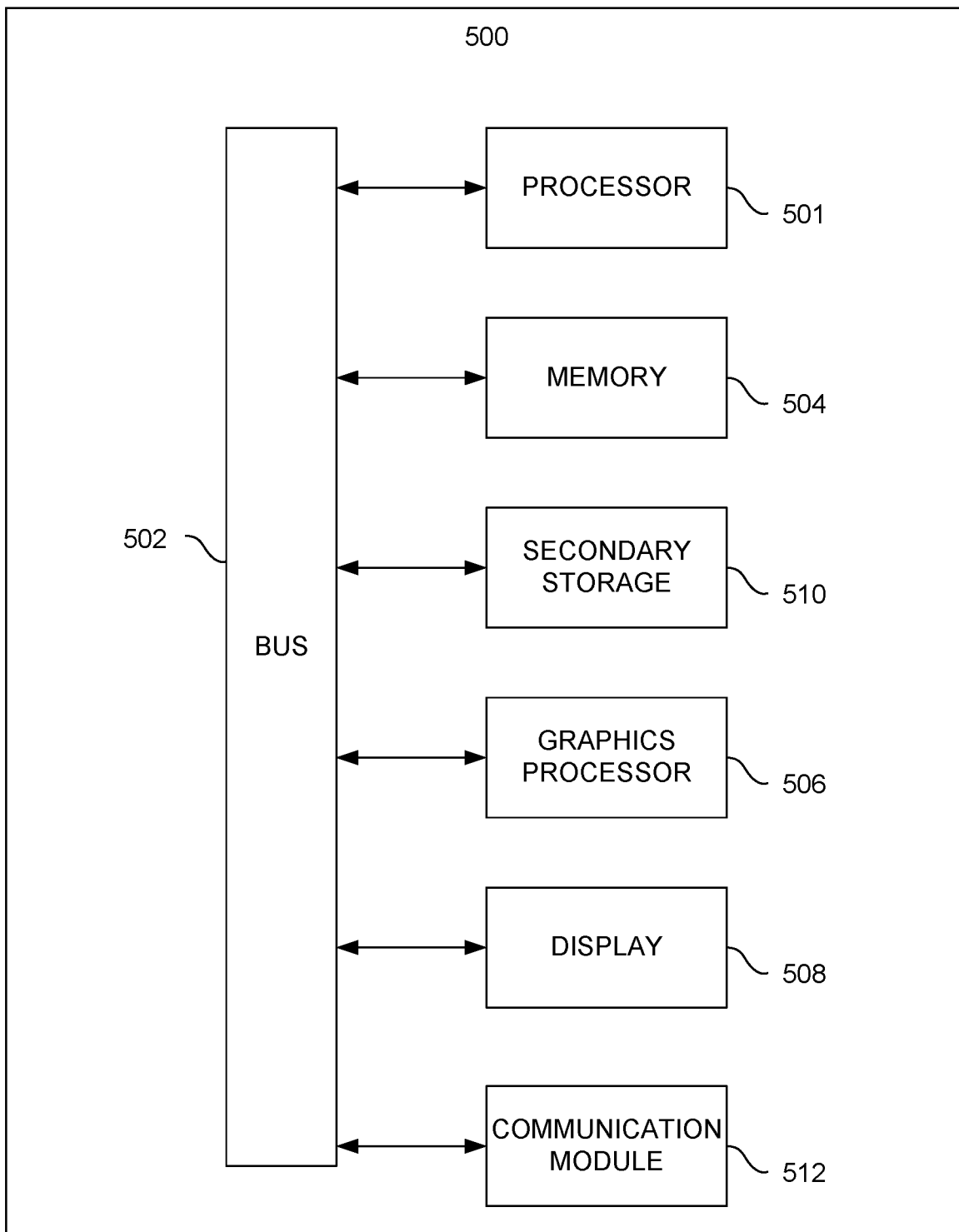
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   receiving, by an intermediary entity system, a request from an interested party to evaluate an artificial intelligence (AI) model created by a third party, the request including:
      a portion of private data of the interested party, and
      an expected output of the AI model when applied to the portion of private data of the interested party;
   receiving, by the intermediary entity system, the AI model created by the third party;
   creating, by the intermediary entity system, a translator function based on a first database schema identified from a sample of the private data of the interested party and a second database schema identified from a sample of data used by the third party to create the AI model, wherein the translator function maps the first database schema of the private data of the interested party to the second database schema which is used by the AI model;
   translating, by the intermediary entity system, the portion of private data of the interested party, using the translator function, from the first schema to the second schema;
   evaluating, by the intermediary entity system, the AI model in association with the translated portion of private data of the interested party by:
      causing the AI model to process the translated portion of private data of the interested party,
      accessing an actual output of the AI model resulting from the processing of the translated portion of private data of the interested party,
      comparing the actual output with the expected output to generate an evaluation of the AI model that indicates an accuracy of the AI model; and
   reporting, by the intermediary entity system, the evaluation of the AI model to the interested party, wherein the interested party uses the evaluation to make an agreement with the third party for use of the AI model in conjunction with the private data of the interested party;
   wherein the intermediary entity system is independent of the interested party and the third party such that that AI model is evaluated without the third party accessing the portion of private data of the interested party and without the interested party accessing the AI model.

2. The non-transitory computer readable medium of claim 1, wherein the request from the interested party is to evaluate a plurality of AI models created by a plurality of different third parties, and wherein the intermediary entity system:
   receives the plurality of AI models from the plurality of different third parties,
   performs the evaluating for each AI model of the plurality of AI models to generate the evaluation of each AI model of the plurality of AI models, and reports the evaluation of each AI model of the plurality of AI models to the interested party.

3. The non-transitory computer readable medium of claim 1, wherein the AI model is created by the third party using data other than the private data of the interested party.

4. The non-transitory computer readable medium of claim 1, wherein the portion of private data of the interested party includes only a subset of all data records of the interested party.

5. The non-transitory computer readable medium of claim 4, wherein the data records include customer records of the interested party.

6. The intermediary entity system of claim 1, wherein the intermediary entity system is in communication with a system of the interested party and a system of the third party via one or more networks.

7. A method, comprising:
receiving, by an intermediary entity system, a request from an interested party to evaluate an artificial intelligence (AI) model created by a third party, the request including:
a portion of private data of the interested party, and
an expected output of the AI model when applied to the portion of private data of the interested party;
receiving, by the intermediary entity system, the AI model created by the third party;
creating, by the intermediary entity system, a translator function based on a first database schema identified from a sample of the private data of the interested party and a second database schema identified from a sample of data used by the third party to create the AI model, wherein the translator function maps the first database schema of the private data of the interested party to the second database schema which is used by the AI model;
translating, by the intermediary entity system, the portion of private data of the interested party, using the translator function, from the first schema to the second schema;
evaluating, by the intermediary entity system, the AI model in association with the translated portion of private data of the interested party by:
causing the AI model to process the translated portion of private data of the interested party,
accessing an actual output of the AI model resulting from the processing of the translated portion of private data of the interested party,
comparing the actual output with the expected output to generate an evaluation of the AI model that indicates an accuracy of the AI model; and
reporting, by the intermediary entity system, the evaluation of the AI model to the interested party, wherein the interested party uses the evaluation to make an agreement with the third party for use of the AI model in conjunction with the private data of the interested party;
wherein the intermediary entity system is independent of the interested party and the third party such that that AI model is evaluated without the third party accessing the portion of private data of the interested party and without the interested party accessing the AI model.

8. The method of claim 7, wherein the request from the interested party is to evaluate a plurality of AI models created by a plurality of different third parties, and wherein the intermediary entity system:
receives the plurality of AI models from the plurality of different third parties,
performs the evaluating for each AI model of the plurality of AI models to generate the evaluation of each AI model of the plurality of AI models, and
reports the evaluation of each AI model of the plurality of AI models to the interested party.

9. The method of claim 7, wherein the AI model is created by the third party using data other than the private data of the interested party.

10. The method of claim 7, wherein the portion of private data of the interested party includes only a subset of all data records of the interested party.

11. The method of claim 10, wherein the data records include customer records of the interested party.

12. An intermediary entity system, comprising:
a non-transitory memory storing instructions; and
one or more processors in communication with the non-transitory memory that execute the instructions to perform a method comprising:
receiving a request from an interested party to evaluate an artificial intelligence (AI) model created by a third party, the request including:
a portion of private data of the interested party, and
an expected output of the AI model when applied to the portion of private data of the interested party;
receiving the AI model created by the third party;
creating a translator function based on a first database schema identified from a sample of the private data of the interested party and a second database schema identified from a sample of data used by the third party to create the AI model, wherein the translator function maps the first database schema of the private data of the interested party to the second database schema which is used by the AI model;
translating the portion of private data of the interested party, using the translator function, from the first schema to the second schema;
evaluating the AI model in association with the translated portion of private data of the interested party by:
causing the AI model to process the translated portion of private data of the interested party,
accessing an actual output of the AI model resulting from the processing of the translated portion of private data of the interested party,
comparing the actual output with the expected output to generate an evaluation of the AI model that indicates an accuracy of the AI model; and
reporting the evaluation of the AI model to the interested party, wherein the interested party uses the evaluation to make an agreement with the third party for use of the AI model in conjunction with the private data of the interested party;
wherein the intermediary entity system is independent of the interested party and the third party such that that AI model is evaluated without the third party accessing the portion of private data of the interested party and without the interested party accessing the AI model.

* * * * *